Patented May 1, 1945

2,375,042

UNITED STATES PATENT OFFICE 2,375,042

STABILIZED BUTADIENE-1,3 POLYMERS

Waldo L. Semon, Silver Lake, Ohio, assignor to The B. F. Goodrich Company, New York, N. Y., a corporation of New York No Drawing. Application January 27, 1941, Serial No. 376,176

12 Claims. (Cl. 260—32)

This invention is directed to a method of stabilizing synthetic rubber-like materials which are prepared by the polymerization or copolymerization of butadienes-1,3 either alone, in mixtures with each other, or in mixtures with other polymerizable compounds, and to the stabilized compositions obtainable thereby.

It is known that synthetic rubber of the type described deteriorates rapidly upon exposure to air and consequently yields only inferior vulcanizates unless there is incorporated therewith a compound which stabilizes the synthetic rubber by largely preventing oxidation, degradation and/or cyclicisation of the chain molecules present in the polymer structure. The well known age-resisters or antioxidants for natural rubber such as aromatic secondary amines, aromatic hydroxy compounds, aldehyde amine condensation products and the like are somewhat effective in stabilizing such polymers against oxygen or air but they possess the disadvantage of impairing their stability to light. Thus, when a butadiene-1,3 polymerizate containing, for example, phenyl beta naphthylamine is exposed to light for only a short time a bright pink or brown coloration appears.

The object of this invention is to provide a method of producing a light stable crude synthetic rubber. Another object is to provide a class of compounds which when incorporated with synthetic rubber will counteract the staining action of age-resisters in the unvulcanized rubber. Still another object is to enhance the stabilizing effect of age-resisters or antioxidants when used in butadiene-1,3 polymers or copolymers.

In the process of this invention synthetic rubber is rendered light stable by the incorporation therein, together with an age-resister or antioxidant, of a salt of dithiocarbamic acid. Among such salts are the alkali metal salts such as sodium or potassium dithiocarbamate, bivalent metal salts such as zinc or magnesium dithiocarbamate, ammonium dithiocarbamate, and salts of dithiocarbamic acid with organic bases such as primary, secondary or tertiary amines. The preferred compounds are the water soluble dithiocarbamates particularly ammonium dithiocarbamate sodium dithiocarbamate and potassium dithiocarbamate.

Although it is known that certain derivatives of dithiocarbamic acid such as the salts of N-aryl or N-alkyl dithiocarbamic acids are accelerators of vulcanization for both natural and synthetic rubber, the salts of unsubstituted dithiocarbamic acid possess only a slight accelerating action even when employed in high concentrations. Consequently these compounds may be used to stabilize synthetic rubber compositions without introducing any difficulties in compounding or curing resulting from the presence of an accelerator.

The dithiocarbamates of this invention may be used to counteract the undesirable staining effects of any of the age-resisters or antioxidants commonly used in rubber and synthetic rubber such as the aromatic secondary amines, phenols, aldehyde amine reaction products and like compounds including, for examples, phenyl beta-naphthyl amine, aldol alpha-naphthyl amine, di beta-naphthyl p-phenylene diamine, ditolyl amine, acetone aniline reaction product, p-isopropoxy diphenyl amine, diphenyl p-phenylene diamine, poly 2,2,4 trimethyl 1,2 dihydro quinoline, meso dimethyl acridane and the like. Synthetic rubber compositions containing such age-resisters or antioxidants and a dithiocarbamate of the character described are also found to be superior in tensile properties and resistance to aging and to oxygen when compared with similar compositions containing no dithiocarbamate. It is also within the scope of this invention to add a dithiocarbamate to compositions which do not contain age-resister since the dithiocarbamate alone also improves the properties of the synthetic rubber.

The synthetic rubbers which may be stabilized in accordance with this invention are the polymers of monomeric materials consisting predominately of a polymerizable butadiene-1,3. Examples of polymerizable butadienes-1,3 include not only butadiene-1,3 itself but also its polymerizable substituted derivatives such as isoprene, 2,3-dimethyl butadiene-1,3, 2-chlorobutadiene-1,3, piperylene and the like; hence synthetic rubbers of the above class include polymers of these materials and also copolymers prepared by the polymerization of monomer mixtures consisting predominately of such a polymerizable butadiene-1,3 and also containing, if desired, other compounds copolymerizable with butadienes-1,3 such as acrylonitrile, methyl methacrylate, styrene, vinyl naphthalene, vinyl ketones, vinylidene chloride and the like.

The incorporation of the dithiocarbamate with the synthetic rubber may be carried out simply by adding the compound either in the solid form or in solution, suspension or emulsion to the solid synthetic rubber during the milling operation or to a latex containing the synthetic rubber dispersed in an aqueous medium such as is ordinarily obtained by an emulsion polymerization process. The preferred procedure is to add the dithiocarbamate as a solution in water to the latex before coagulation since the coagulated rubber is thereby obtained in a stable state. Addition of the dithiocarbamate may be made prior to, simultaneous with, or subsequent to the addition of the age-resister. Latex containing synthetic rubber, age-resister and dithiocarbamate is stable and may be used as such or it may be coagulated by ordinary methods to produce massive synthetic rubber. When the dithiocarbamate is added to the latex and the latter is then coagulated by the addition of an acidic coagulant, free dithiocarbamic acid is liberated. This free acid may then react with the synthetic rubber or with the age-resister or it may decompose into carbon disulfide and ammonia. In any event, however, the crude rubber is obtained in a stabilized form even though an acidic coagulant is employed.

Only small amounts of the dithiocarbamate need be added to synthetic latex or synthetic rubber to produce the desired result, amounts ranging from 0.5 to 2% based on the rubber being most effective. However, the proportion is not critical and may be varied at will.

As a specific example of one embodiment of this invention, a latex containing a butadiene acrylonitrile copolymer is prepared by emulsion polymerization and is divided into two parts. Both portions of latex are mixed with an aqueous emulsion containing phenyl beta naphthylamine in such proportion that the copolymer contains 3% by weight of the age-resister. Ammonium dithiocarbamate is added in form of an aqueous solution to one portion of the latex in an amount equal to 1% based on the copolymer. Both portions are then coagulated by the combined action of a saturated salt solution and dilute sulfuric acid, and the coagulum is filtered, washed and dried. After standing for a few hours exposed to light, the copolymer containing only phenyl beta naphthylamine assumes a bright pink coloration while the copolymer formed by the coagulation of the latex which also contained ammonium dithiocarbamate remains substantially white. The two butadiene acrylonitrile copolymer samples are then compounded similarly with stearic acid, zinc oxide, carbon black, sulfur and accelerator, and are vulcanized. A tensile strength of 4800 lb./sq. in. was obtained with the vulcanizate stabilized by the method of this invention as compared with a value of 4000 lb./sq. in. for the composition containing no dithiocarbamate thus showing that, in addition to the anti-staining action, the practice of this invention produces an improvement in properties of the vulcanizates.

It is to be understood that the above example is merely illustrative of the present invention and that substitutions of materials, methods, and proportions may be effected therein without departing from the scope of the invention as defined in the appended claims.

I claim:

1. A composition of matter which comprises a polymer of a monomeric material consisting predominately of a polymerizable butadiene-1,3 and, incorporated therein, a salt of unsubstituted dithiocarbamic acid.

2. A composition of matter which comprises an aqueous dispersion containing a polymer of a monomeric material consisting predominately of a polymerizable butadiene-1,3 and, incorporated therein, a salt of unsubstituted dithiocarbamic acid.

3. A composition of matter which comprises a polymer of a monomeric material consisting predominately of a polymerizable butadiene-1,3 and, incorporated therein, an age-resister and a salt of unsubstituted dithiocarbamic acid.

4. A composition of matter which comprises a polymer of a monomeric material consisting predominately of butadiene-1,3 and, incorporated therein, an age-resister and a salt of unsubstituted dithiocarbamic acid.

5. A composition of matter which comprises an aqueous dispersion containing a polymer of a monomeric material consisting predominately of butadiene-1,3 and, incorporated therein, an age-resister and a water-soluble salt of unsubstituted dithiocarbamic acid.

6. A composition of matter which comprises a polymer of a monomeric material consisting predominately of butadiene-1,3 and, incorporated therein, phenyl-beta naphthylamine and ammonium dithiocarbamate.

7. A composition of matter which comprises a copolymer of butadiene-1,3 with a lesser amount of acrylonitrile and, incorporated therein, a salt of unsubstituted dithiocarbamic acid.

8. A composition of matter which comprises an aqueous dispersion containing a copolymer of butadiene-1,3 with a lesser amount of acrylonitrile and, incorporated therein, an age-resister and a water-soluble salt of unsubstituted dithiocarbamic acid.

9. A composition of matter which comprises a copolymer of butadiene-1,3 with a lesser amount of acrylonitrile and, incorporated therein, phenyl-beta-naphthylamine and a salt of unsubstituted dithiocarbamic acid.

10. A composition of matter which comprises an aqueous dispersion containing a copolymer of butadiene-1,3 with a lesser amount of acrylonitrile and, incorporated therein, a phenyl-beta-naphthylamine and ammonium dithiocarbamate.

11. A composition of matter which comprises a copolymer of butadiene-1,3 with a lesser amount of styrene and, incorporated therein, an age-resister and a salt of unsubstituted dithiocarbamic acid.

12. A composition of matter which comprises an aqueous dispersion containing a copolymer of butadiene-1,3 with a lesser amount of styrene and, incorporated therein, phenyl-beta-naphthylamine and ammonium dithiocarbamate.

WALDO L. SEMON.